INVENTORS
WILLIAM BOCHKOROS
LOUIS J. SZABO
BY
Evans & Pearne
Attorneys

United States Patent Office 3,150,677
Patented Sept. 29, 1964

3,150,677
STEAM TRAP
William Bochkoros, Middleburg Heights, and Louis J. Szabo, Fairview Park, Ohio, assignors, by mesne assignments, to The Clark-Reliance Corp., Cleveland, Ohio, a corporation of Ohio
Filed Jan. 6, 1961, Ser. No. 81,186
8 Claims. (Cl. 137—183)

This invention relates to steam traps employed for the removal of accumulations of condensed steam and air from steam systems. More particularly, the invention relates to steam traps in which the removal of condensate and air is accomplished automatically.

This application is a continuation-in-part of application Serial No. 42,290, filed July 12, 1960, now abandoned.

Steam traps having a floating disc to open and close the trap have been in use for a number of years because of their relative simplicity of construction and the minimum of maintenance required to keep them in operating condition. These traps generally are of two types, those having a bleeder duct, for example, as shown in Bradly British Patent No. 575,490, and those in which no bleeder duct is present, for example, as shown in Gedge British provisional specification No. 1596 of 1878. Some later floating disc trap proposals have not employed a bleeder duct, for example, see Midgette U.S. Patent No. 2,817,353.

The floating disc in both types of traps is a movable sealing disc or member positioned in a chamber through which the fluid passes during its flow through the trap. The sealing disc is designed to contact valve seats in this intermediate chamber and thereby shut off the flow through the trap. The force exerted against the disc by the fluid in the intermediate chamber determines whether or not the disc is in contact with the valve seats or spaced therefrom. When air and condensate are passing through the trap, the sealing disc is pushed away from the seating surfaces by the force of the fluid in the system bearing against the sealing disc. This condition permits the free flow of condensate and air through the trap.

When substantially all of the condensate has passed through the trap, steam tends to accumulate in the intermediate chamber behind the sealing disc, until its pressure causes the disc to move into contact with the valve seats of the inlet and outlet openings.

Efforts have been directed to reducing the size of floating disc traps, but difficulties have been encountered in that frequently the capacities and efficiencies of such traps were also materially reduced.

A principal object of the present invention is to provide a steam trap of the bleeder duct type having a substantially larger capacity for an equivalent size trap.

Another object of the invention is to provide a sealing disc and valve seat assembly which may be used to replace the sealing disc and valve seat in existing traps so as to increase the capacity of traps now in operation.

Another object of the invention is to provide a steam trap which is relatively simple in construction and which may be manufactured at relatively low cost.

These and other objects of the invention will be more readily understood from the following detailed description of the drawing, in which.

Figure 1:
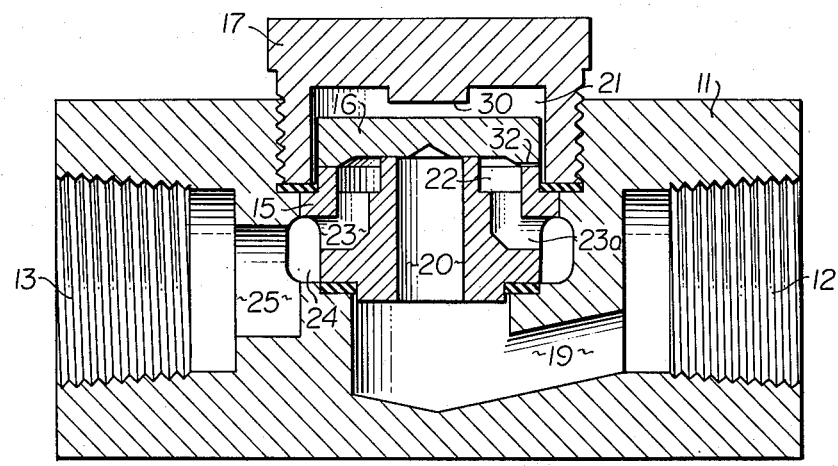
FIGURE 1 is a sectional elevation of a steam trap of the present invention.
Figure 2:
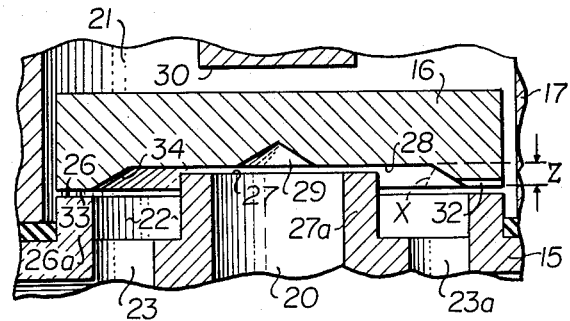
FIGURE 2 is an enlarged, fragmentary section of a portion of the trap shown in FIGURE 1.
Figure 3:
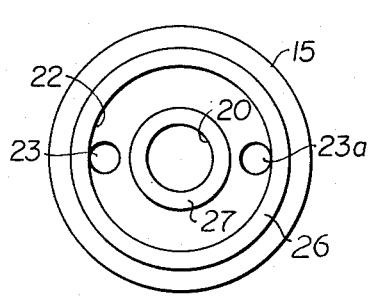
FIGURE 3 is a plan view of the seat member of FIGURE 1.
Figure 5:
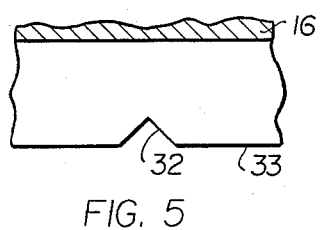
FIGURE 5 is an enlarged view taken along line 5—5 of FIGURE 4.
Figure 4:
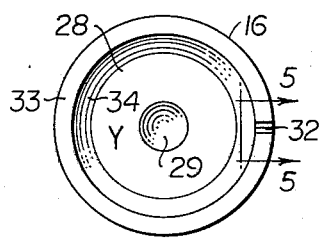
FIGURE 4 is a bottom plan view showing the sealing disc of FIGURE 1.

As shown in the drawing, a steam trap having a body 11 has inlet and outlet openings 12 and 13 for receiving the ends of pipes to connect the trap into a steam system. The trap body 11 has an opening extending down from the top into which is positioned a seat member 15 and a sealing disc 16.

The seat member 15 and the disc 16 are retained within the body 11 by means of a cap 17, which may be threadedly secured to the body.

Fluid such as steam, condensate water, or air passing into inlet opening 12 moves along passage 19 and up through central opening 20 of seat member 15. The fluid forces disc 16 away from the seat member 15. A portion of the fluid passes into chamber 21 formed by cap 17 and seat member 15. Other portions of the fluid pass into outlet chamber 22, downwardly through outlet passages 23 and 23a in seat member 15 and into an annular lower chamber 24. From chamber 24, the fluid moves through passage 25 and out of outlet opening 13.

Seat member 15 has a pair of concentric seating surfaces 26 and 27. As shown in the drawing, these surfaces are preferably in the form of annular ribs in which the seating surface 27 of the inner rib or ring 27a is in a plane above the surface 26 of the outer ring 26a.

To form a suitable seal between the seat member 15 and the sealing disc 16, the bottom surface of the disc has a recessed central portion 28, preferably substantially parallel to the outer bottom surface 33 of the disc. In the preferred embodiment of the invention, a counterbore 29 is provided in the recessed central portion 28 of the disc.

During the operation of the steam trap, the sealing disc 16 is moved by the action of the fluid passing through the trap from a position in which the disc contacts the seating surfaces 26 and 27 of member 15 to a point at which it is spaced from the seating surfaces.

In order that a space or chamber be maintained above sealing disc 16 for the entrance of fluid, means are preferably provided to prevent substantially complete contact with the top of the intermediate chamber 21, that is, the interior of cap 17. Unless a chamber is maintained above the disc, steam cannot reach a position to permit the exertion of force against the upper surface of the disc to effect reseating of the disc against seating surfaces 26 and 27 and thereby close the trap.

As shown in the drawing, the distance that the disc may move from the seating surfaces 26 and 27 is controlled by a suitable projection 30 depending from the interior of the cap 17. The maintenance of a chamber and control of the distance which the disc may move from the seating surfaces may be achieved by means other than projection 30, if desired. For example, a projection similar to projection 30 may be provided on the top surface of the sealing disc, or cap 17 may have a concavely-curved interior surface.

The frequency of cycling of the trap, that is, the opening and closing thereof to discharge condensate and air, is a function of the pressure fluctuation in the intermediate chamber 21. In starting up a steam system, the air and condensate entering the trap through central opening 20 force the disc 16 away from seat member 15, allowing the air and condensate to pass through the trap freely. After most of the condensate and air have passed through the trap, the last portion thereof is at a temperature closely approaching the steam temperature of the system. Since the condensate is at such a high temperature, there is a tendency for a portion thereof to flash into steam and this, together with the kinetic energy of the fluid, increases the fluid pressure in chamber 21. Since the fluid in chamber 21 acts mainly against the large top area of the disc 16, the total force acting against the top surface of the disc becomes greater than the force acting on the bottom surface of the disc and, thereby, the disc is forced into contact with the seat member 15 to close the trap. Closing of the trap may even occur though the unit pressure in chamber 21 may be less than the unit pressure in the system.

The sealing disc 16 will remain in contact with seat member 15 until the fluid pressure in chamber 21 is reduced to the point that the force acting against the top surface of the disc is less than the effective force exerted against the bottom surface of the disc. This reduction in pressure is largely the result of two factors: one, the heat energy transferred to the surrounding atmosphere; and two, the fluid which escapes through a small bleeder passage connecting the intermediate chamber 21 and outlet chamber 22. Such a bleeder passage is desirable to insure proper operation of the trap, that is, the opening and closing of the trap at sufficiently frequent intervals and the prevention of possible air locks.

This bleeder passage may be formed by a duct in the bottom surface 33 of the sealing disc 16 or a duct in seating surface 26 which contacts the bottom surface 33, or by ducts in both surfaces. As shown in the drawing, a bleeder duct 32 is located in the bottom surface 33 of the disc 16. The duct 32 extends from the outer periphery of the disc to conical surface 34 which connects the bottom surface with recessed central portion 28.

When the sealing disc 16 contacts seating surface 27, the central inlet opening 20 is sealed from the outlet chamber 22. Likewise, the outlet chamber 22 is sealed from intermediate chamber 21 by the contact of disc surface 33 with seating surface 26. However, the aforementioned duct 32 gradually bleeds a portion of the fluid present in chamber 21 into outlet chamber 22, thus reducing the pressure in chamber 21 and hastening the opening of the trap by the unseating of disc 16.

The size of the duct 32 controls the rate at which the pressure in chamber 21 is reduced and therefore controls the frequency with which the disc 16 will move away from contact with seating surfaces 26 and 27 to permit the removal of condensate accumulated in the system adjacent to the trap and thereby prevent excessive condensate accumulation in the system in which the trap is employed. Advantageously, the duct has a depth of at least about 0.001 inch and may be of a depth up to 0.003 or 0.004 inch or so. As the size of the duct is increased above .001 inch, the cycling of the trap becomes more frequent.

It has been found in accordance with the present invention that when the disc 16 and seat member 15 are constructed so that the inner seating surface 27 is above outer seating surface 26, the capacity of the trap of the invention is substantially increased. Also, for a given area of outlet opening the capacity of the trap is increased when a plurality of outlet openings spaced angularly apart are provided. Preferably, two or three outlet openings are employed.

Examples are given hereafter showing the substantially larger capacities obtainable in the steam traps of the present invention as compared with similar traps employing other constructions.

While the examples give specific dimensions for the particular traps tested, such sizes and dimensions of the parts may be modified without destroying the benefits of the invention. In some cases, one or more of the dimensions may be varied without significantly affecting the operation of the trap. For example, the diameter and thickness of the sealing disc 16 and the size of the inlet and outlet openings in the seat member 15 may be varied. However, the seating surfaces should be in different planes with the surface 27 which seals the inlet opening in a plane above the outer seating surface 26, and a plurality of outlet openings should be provided.

On the other hand, when a substantial change is desired in one of the elements such as the angle of the conical plane 34 of the disc, the area of the central portion 28, or the vertical distance between the surfaces 28 and 33, it is generally advantageous to make appropriate changes in one or more of the other elements. This reduces the possibility of deleteriously affecting the operation of the trap such as, for example, reducing the capacity of the trap or causing the trap to fail to open or close at the desired intervals.

Thus, where it is desired to increase the angle (X) of the conical plane 34 of the disc, it is advantageous to increase the area (Y) of central portion 28, reduce the vertical distance (Z) between the surfaces 28 and 33, or make changes in both the area Y and the distance Z. Similarly, if the angle X is decreased, appropriate changes generally will be desirable in the area Y and/or the distance Z. In the same manner, if it be desired to increase the area Y, the angle X and/or the vertical distance Z may be increased with the inverse changes being made for a decrease in the area Y. On the other hand, an increase in the distance Z may make it desirable to increase the area Y and/or decrease the angle X, while if a decrease in the distance Z is desired, the area Y may be decreased and/or the angle X increased.

Another relationship which has been observed in the trap of the present invention is that the diameter of the inlet opening 20 appears to operate best when it is about three to five times the distance which the disc 16 is permitted to move away from the seat member 15. Also, the diameter of the recessed central portion 28 of the disc appears to operate more advantageously when it is about 1¼ to 1¾ times the diameter of the inlet seating surface 27. Preferably, the outside diameter of the disc should be approximately three to four times that of the inlet opening.

It will be seen that the following specific examples, which show the substantially larger capacities of the trap of the invention, have the relationships mentioned above.

*Example I*

A steam trap of the present invention having inlet and outlet openings of ½-inch nominal pipe thread size was tested to determine the maximum condensate capacity thereof at various condensate temperatures, with steam at about 50 p.s.i. gauge pressure.

The sealing disc was about 5/16-inch thick and ⅞-inch in diameter, and had a recessed central portion in its bottom surface. The distance between the recessed center and the outer surface was about 1/32-inch. The recessed central portion was slightly larger than ½-inch in diameter and had a 5/32-inch counterbore in its center. The inclined plane connecting the recessed central portion with the outer seating surface was at an angle of 20 degrees. A small bleeder duct was provided in the bottom surface of the disc. The inlet passage was 9/32-inch in diameter. The two outlet passages in the seat member were each approximately ⅛-inch in diameter.

The following table shows the condensate capacity at particular condensate temperatures:

| | °F. |
|---|---|
| 960 pounds of condensate per hour | 255 |
| 940 pounds of condensate per hour | 260 |
| 860 pounds of condensate per hour | 270 |
| 820 pounds of condensate per hour | 280 |

*Example II*

The trap employed in this example was similar in construction to the trap of Example I, except that there was only one outlet passage in the seat member. The diameter of the outlet passage was about 5/32-inch, to equal the total area of the two outlet passages in the trap of Example I.

The following table shows the condensate capacity measured at various condensate temperatures:

|  | ° F. |
|---|---|
| 660 pounds of condensate per hour | 246 |
| 630 pounds of condensate per hour | 258 |
| 620 pounds of condensate per hour | 282 |

*Example III*

The trap of this example was similar in construction to the trap of Example I, except that the bottom surface of the sealing disc had an outwardly extending central portion instead of a recessed center. The central portion extended about 1/16-inch beyond the outer seating surface. The overall thickness of the sealing disc was about 3/16-inch. The seat member employed with this sealing disc was constructed to correspond to the shape of the sealing disc so that both seating surfaces would be sealed at the same time.

The following table shows the condensate capacity of the trap at various condensate temperatures:

|  | ° F. |
|---|---|
| 620 pounds of condensate per hour | 255 |
| 600 pounds of condensate per hour | 270 |
| 580 pounds of condensate per hour | 285 |

*Example IV*

The steam trap of Example I was tested with steam at 100 p.s.i. gauge pressure. The following condensate capacities were obtained at the temperatures listed below:

|  | ° F. |
|---|---|
| 1200 pounds of condensate per hour | 290 |
| 1140 pounds of condensate per hour | 300 |
| 1100 pounds of condensate per hour | 310 |
| 960 pounds of condensate per hour | 320 |
| 900 pounds of condensate per hour | 330 |

*Example V*

The steam trap employed in this example was the same as that of Examples I and IV, except that the bottom surface of the sealing disc was flat instead of having a recessed central portion. The disc thickness was 3/16-inch and the diameter about 7/8-inch.

The following table shows the results of tests to determine the maximum condensate capacity with steam at 100 p.s.i. gauge pressure:

|  | ° F. |
|---|---|
| 970 pounds of condensate per hour | 293 |
| 930 pounds of condensate per hour | 297 |
| 860 pounds of condensate per hour | 305 |
| 810 pounds of condensate per hour | 315 |

A comparison of the results obtained in the above examples shows that the steam trap construction of the present invention provides substantially larger condensate capacities than other disc trap constructions. The trap of the invention is exemplified in Examples I and IV, with the tests being performed at 50 and 100 p.s.i. gauge pressures, respectively.

Example II employs a trap construction in which a single outlet opening is employed instead of a plurality of outlet openings, as in the trap of the invention. Comparing the results of this trap with the trap of Example I shows that at approximately corresponding temperatures, the condensate capacity is almost 50% larger for the trap of the invention.

In Example III, the trap employed has a sealing disc with an outwardly extending or thickened central portion of the bottom surface. Comparing the results obtained with this construction with the trap of the invention (Example I) also shows that the trap of the invention provides a capacity almost 50% greater.

In Example V, the sealing disc employed in the trap has a flat bottom surface. This change in construction from the trap of the invention reduced the capacity of the trap substantially.

*Example VI*

The trap of this example was similar in construction to the trap of Example I except that the diameter of the recessed central portion of the sealing disc was about 5/8-inch and the inclined plane connecting the recessed central portion with the outer seating surface was at an angle of about 36 degrees.

The trap was tested with steam at 200 p.s.i. gauge pressure. The following shows the condensate capacity at particular condensate temperatures:

|  | ° F. |
|---|---|
| 2160 pounds of condensate per hour | 337 |
| 2040 pounds of condensate per hour | 347 |
| 1920 pounds of condensate per hour | 352 |
| 1890 pounds of condensate per hour | 354 |

*Example VII*

A steam trap of the invention having inlet and outlet openings of 3/4-inch nominal pipe thread size was tested to determine the maximum condensate capacity thereof at various condensate temperatures with steam at particular pressures.

The sealing disc was about 3/16-inch thick and 1 1/4-inches in diameter and had a recessed central portion in its bottom surface. The distance between the recessed center and the outer surface was about 1/32-inch. The recessed central portion was slightly less than one inch in diameter and had a 5/32-inch counterbore in its center. The inclined plane connecting the recessed central portion with the outer seating surface was at an angle of about 30 degrees. The inlet passage was about 7/16-inch in diameter while the two outlet passages were each about 3/16-inch in diameter. A small bleeder duct was provided in the bottom surface of the disc.

The following table lists the results of condensate capacity tests at particular gauge pressures and a number of different condensate temperatures:

| P.s.i. | ° F. | Pounds of condensate per hour |
|---|---|---|
| 50 | 190 | 2,280 |
| 50 | 231 | 2,075 |
| 50 | 250 | 1,890 |
| 50 | 265 | 1,895 |
| 50 | 275 | 1,775 |
| 75 | 140 | 3,240 |
| 75 | 285 | 2,250 |
| 100 | 140 | 3,720 |
| 100 | 308 | 2,460 |
| 150 | 180 | 4,680 |
| 150 | 330 | 3,000 |

When commercially available disc traps of equivalent sizes were tested in the manner described in the examples, the capacities were found to be no better, and in some cases worse, than the trap constructions of Examples II, III, and V, and were of much smaller capacity than the traps of the invention (Examples I, IV, VI and VII).

From the foregoing description, it will be appreciated that the present invention provides a new and improved steam trap which has important advantages over the steam traps known heretofore. The capacity of the trap is substantially greater for an equivalent size trap than for conventional traps. Also, the present invention provides a sealing disc and valve seat assembly which may be used to replace the sealing disc and valve seat in existing traps in order to increase the capacity of traps now in operation. In addition, the steam trap of the invention is relatively simple in construction and may be manufactured at low cost.

It is apparent from the above description of the invention that various modifications in the trap structure described may be made within the scope of the invention. Therefore, the invention is not intended to be limited to the specific details of the structure disclosed

What is claimed is:

1. A floating disc type steam trap comprising a trap body having inlet and outlet openings separated by an intermediate chamber, an inlet passage connecting said intermediate chamber with said inlet opening and an outlet passage connecting said intermediate chamber with said outlet opening, said passages terminating at said intermediate chamber in a plurality of seating surfaces lying in spaced parallel planes with the seating surface associated with said inlet passage extending farther into the intermediate chamber than the other seating surface, a sealing disc positioned in said intermediate chamber, the bottom surface of said sealing disc having a recessed central portion overlying said inlet passage and providing a sealing surface for engagement with said seating surface associated with said inlet passage, the bottom surface of said sealing disc also having a sealing surface disposed to engage said other seating surface, the depth of said recess being equal to the distance between said parallel planes, and a bleeder duct connecting said intermediate chamber with said outlet opening when the sealing disc bears against said seating surface to close the passages connecting said inlet and outlet openings with said chamber, said intermediate chamber being of a size to permit the movement of said sealing disc from a position which closes the passages from said inlet and outlet openings to a position which permits the flow of fluid through said trap body.

2. A floating disc type steam trap comprising a trap body having inlet and outlet openings separated by an intermediate chamber, an inlet passage connecting said intermediate chamber with said inlet opening and an outlet passage connecting said intermediate chamber with said outlet opening, said passages terminating at said intermediate chamber in a plurality of seating surfaces lying in spaced parallel planes with the seating surface associated with said inlet passage extending farther into the intermediate chamber than the other seating surface, a sealing disc positioned in said intermediate chamber, the bottom surface of said sealing disc having a recessed central portion overlying said inlet passage and providing a sealing surface for engagement with said seating surface associated with said inlet passage, the bottom surface of said sealing disc also having a sealing surface disposed to engage said other seating surface, the depth of said recess being equal to the distance between said parallel planes, said intermediate chamber being of a size to permit the movement of said sealing disc from a position which closes the passages from said inlet and outlet openings to a position which permits the flow of fluid through said trap body.

3. A floating disc type steam trap comprising a trap body having inlet and outlet openings separated by an intermediate chamber, an inlet passage connecting said intermediate chamber with said inlet opening and an outlet passage connecting said intermediate chamber with said outlet opening, said passages terminating at said intermediate chamber in a plurality of seating surfaces lying in spaced parallel planes with the seating surface associated with said inlet passage extending farther into the intermediate chamber than the other seating surface, and a sealing disc positioned in said intermediate chamber, the bottom surface of said sealing disc having a recessed central portion overlying said inlet passage and providing a sealing surface for engagement with said seating surface associated with said inlet passage, the bottom surface of said sealing disc also having a sealing surface disposed to engage said other seating surface, the depth of said recess being equal to the distance between said parallel planes, said intermediate chamber being of a size to permit the movement of said sealing disc from a position which closes the passages from said inlet and outlet openings to a position which permits the flow of fluid through said trap body, and means for keeping the top surface of said sealing disc spaced from the top of said intermediate chamber.

4. A floating disc type steam trap comprising a trap body having inlet and outlet openings separated by an intermediate chamber, an inlet passage connecting said intermediate chamber with said inlet opening and an outlet passage connecting said intermediate chamber with said outlet opening, said inlet and said outlet passages terminating at said intermediate chamber in an inner seating surface and an outer seating surface, respectively, said seating surfaces being concentric and disposed in spaced parallel planes with said inner seating surface being disposed further into said intermediate chamber than said outer seating surface, a sealing disc positioned in said intermediate chamber, the bottom surface of said sealing disc having a recessed central portion overlying said inlet passage and providing a sealing surface for engagement with said inner seating surface, said bottom surface also having an outer sealing surface for engagement with said outer seating surface, the depth of said recess being equal to the distance between said parallel planes, said intermediate chamber being of a size to permit the movement of said sealing disc from a position which closes the passages from said inlet and outlet openings to a position which permits the flow of fluid through said trap body.

5. A floating disc type steam trap comprising a trap body having inlet and outlet openings separated by an intermediate chamber, an inlet passage connecting said intermediate chamber with said inlet opening and a plurality of outlet passages angularly disposed around said inlet passage and connecting said intermediate chamber with said outlet opening, said inlet and said outlet passages terminating at said intermediate chamber in an inner seating surface and an outer seating surface, respectively, said seating surfaces being concentric and disposed in spaced parallel planes with said inner seating surface being disposed further into said intermediate chamber than said outer seating surface, a sealing disc positioned in said intermediate chamber, the bottom surface of said sealing disc having a recessed central portion overlying said inlet passage and providing a sealing surface for engagement with said inner seating surface said bottom surface also having an outer sealing surface for engagement with said outer seating surface, the depth of said recess being equal to the distance between said parallel planes, said intermedaite chamber being of a size to permit the movement of said sealing disc from a position which closes the passages from said inlet and outlet openings to a position which permits the flow of fluid through said trap body, a bleeder duct connecting said intermediate chamber with said outlet opening, when said disc is in said closing position, and means for keeping the top surface of said sealing disc spaced from the top of said intermediate chamber.

6. A floating disc type steam trap comprising a trap body having inlet and outlet openings separated by an intermediate chamber, a seat member positioned within said trap body and forming the lower portion of said intermediate chamber, said seat member having at least one inlet passage connecting said intermediate chamber with said inlet opening and a plurality of outlet passages angularly spaced around said inlet passage and connecting said intermediate chamber with said outlet opening, said inlet passage terminating at said intermediate chamber in an annular inlet seating surface, said outlet passages terminating in said intermediate chamber in an outlet seating surface concentric with and surrounding said inlet seating surface, said seating surfaces being disposed in spaced parallel planes with said inlet seating surface at a higher level than said outlet seating surface, a sealing disc positioned in said intermediate chamber, the bottom surface of said sealing disc having a recessed central portion overlying said inlet passage and providing a sealing surface for engagement with said inlet seating surface, and an outer sealing surface for engagement with said outlet seating surface, the depth of said recess being equal to the distance between said parallel planes, said intermediate chamber being of a size to permit the movement of said sealing disc from a position which closes the passages from said inlet and outlet openings to a position which permits the flow of fluid through said trap body.

7. A floating disc type steam trap comprising a trap body having inlet and outlet openings separated by an intermediate chamber, an inlet passage connecting said intermediate chamber with said inlet opening and an outlet passage connecting said intermediate chamber with an outlet opening, said passages terminating at said intermediate chamber in two concentric annular seating surfaces, the inner seating surface being associated with said inlet passage and disposed at a level above the outer seating surface, a sealing disc positioned in said intermediate chamber above said seating surfaces, the bottom of said sealing disc having sealing surfaces for engagement with said seating surfaces, said sealing surfaces being spaced from each other to correspond to the spacing between said seating surfaces, said disc having a sloping annular surface between said sealing surfaces, said intermediate chamber being of a size to permit the movement of said disc from a position in which each sealing surface engages its corresponding seating surface, thereby blocking communication between said inlet and outlet passages and said intermediate chamber, to a position which permits the flow of fluid through said trap body, the slope of said sloping annular surface being such that fluid flowing through said trap body beneath said disc from said inlet to said outlet is directed in a downward direction by said sloping annular surface whereby the reaction of the flow of fluid across said sloping annular surface tends to move said disc upwardly away from said seating surfaces.

8. A floating disc type steam trap comprising a trap body having inlet and outlet openings separated by an intermediate chamber, an inlet passage connecting said intermediate chamber with said inlet opening and an outlet passage connecting said intermediate chamber with an outlet opening, said passages terminating at said intermediate chamber in two concentric annular seating surfaces with the inner of said seating surfaces being associated with said inlet passage and disposed at a level above the level of the outer seating surface, a sealing disc positioned in said intermediate chamber above said seating surfaces, the bottom of said sealing disc having sealing surfaces for engagement with said seating surfaces, said sealing surfaces being spaced from each other to correspond to the spacing between said seating surfaces, said disc having a sloping annular surface between said sealing surfaces, said intermediate chamber being of a size to permit the movement of said disc from a closed position in which each sealing surface engages its corresponding seating surface, thereby blocking communication between said inlet and outlet passages and said intermediate chamber, to an open position which permits the flow of fluid through said trap body, the slope of said sloping annular surface being such that fluid flowing through said trap body beneath said disc from said inlet to said outlet is directed in a downward direction by said sloping annular surface whereby the reaction of the flow of fluid across said sloping annular surface tends to move said disc upwardly away from said seating surfaces, a bleeder duct connecting said intermediate chamber with said outlet opening when said disc is in said closed position, and means for keeping the top surface of said sealing disc spaced from the top of said intermediate chamber.

References Cited in the file of this patent
UNITED STATES PATENTS

| 2,884,944 | Giles | May 5, 1959 |
| 2,951,496 | Yarnall | Sept. 6, 1960 |

FOREIGN PATENTS

| 1,066,591 | Germany | Oct. 8, 1959 |